(12) United States Patent
Martin et al.

(10) Patent No.: US 7,646,354 B2
(45) Date of Patent: Jan. 12, 2010

(54) ANTENNAE DEVICE FOR READING ELECTRONIC LABELS AND SYSTEM COMPRISING SAME

(75) Inventors: Philippe Martin, Beaune (FR); Pierre Pic, La Ciotat (FR)

(73) Assignee: Gemalto SA, Gemenos (FR)

( * ) Notice: Subject to any disclaimer, the term of this patent is extended or adjusted under 35 U.S.C. 154(b) by 657 days.

(21) Appl. No.: 10/433,692

(22) PCT Filed: Dec. 5, 2001

(86) PCT No.: PCT/FR01/03833

§ 371 (c)(1),
(2), (4) Date: Jun. 5, 2003

(87) PCT Pub. No.: WO02/47015

PCT Pub. Date: Jun. 13, 2002

(65) Prior Publication Data

US 2004/0046698 A1 Mar. 11, 2004

(30) Foreign Application Priority Data

Dec. 5, 2000 (FR) .................................. 00 15758

(51) Int. Cl.
*H01Q 21/00* (2006.01)
*G06K 19/02* (2006.01)
*G08B 13/14* (2006.01)

(52) U.S. Cl. ..................... 343/844; 235/487; 340/572.7

(58) Field of Classification Search .................. 340/3.7, 340/10.52, 10.3, 10.42, 572.7; 343/702, 343/700 MS, 893, 894, 487; 235/492, 487, 235/451, 844

See application file for complete search history.

(56) References Cited

U.S. PATENT DOCUMENTS

| | | | | |
|---|---|---|---|---|
| 4,117,481 A | * | 9/1978 | Constant | 342/44 |
| 4,167,738 A | * | 9/1979 | Kirkendall | 343/703 |
| 4,684,952 A | * | 8/1987 | Munson et al. | 343/700 MS |
| 4,700,197 A | | 10/1987 | Milne | |
| 4,728,805 A | * | 3/1988 | Dempsey | 250/208.3 |
| 5,500,651 A | * | 3/1996 | Schuermann | 342/42 |
| 5,729,236 A | * | 3/1998 | Flaxl | 342/374 |

(Continued)

FOREIGN PATENT DOCUMENTS

EP 0593131 A 4/1994

(Continued)

*Primary Examiner*—Douglas W Owens
*Assistant Examiner*—Minh D A
(74) *Attorney, Agent, or Firm*—Buchanan Ingersoll & Rooney PC

(57) ABSTRACT

An antennae device for reading electronic labels includes passive antennae arranged in the form of an array comprising L lines and C columns. The antennae are located in the array by co-ordinates (i, j), i ranging from 1 to L, j ranging from 1 to C. Each antenna (i, j) is controlled by two control switches, one controlling the antennae located on a line i, the other controlling the antennae located on a column j.

28 Claims, 5 Drawing Sheets

U.S. PATENT DOCUMENTS

| | | | |
|---|---|---|---|
| 5,905,473 A * | 5/1999 | Taenzer | 343/834 |
| 5,945,938 A * | 8/1999 | Chia et al. | 342/42 |
| 6,104,311 A * | 8/2000 | Lastinger | 340/10.51 |
| 6,201,508 B1 * | 3/2001 | Metzen et al. | 343/778 |
| 6,239,675 B1 * | 5/2001 | Flaxl | 334/55 |
| 6,317,097 B1 * | 11/2001 | Smith | 343/789 |
| 6,566,689 B2 * | 5/2003 | Hoelen et al. | 257/89 |
| 6,700,544 B2 * | 3/2004 | Anderson | 343/701 |
| 6,714,121 B1 * | 3/2004 | Moore | 340/10.3 |
| 6,724,308 B2 * | 4/2004 | Nicholson | 340/572.1 |
| 6,745,008 B1 * | 6/2004 | Carrender et al. | 455/41.1 |

FOREIGN PATENT DOCUMENTS

WO     WO97/49076 A     12/1997

* cited by examiner

ANTENNAE DEVICE FOR READING ELECTRONIC LABELS AND SYSTEM COMPRISING SAME

This disclosure is based upon French Application No. 00/15758, filed on Dec. 5, 2000 and International Application No. PCT/FR01/03833, filed Dec. 5, 2001, the contents of which are incorporated herein by reference.

BACKGROUND OF THE INVENTION

The invention relates to an antenna device for reading electronic labels and a system for reading electronic labels.

The field of the invention is that of radio frequency identification or RFID applied in particular to the reading of electronic labels (tags) apposed to objects grouped together in a small area.

An electronic label comprises a chip and an antenna, both buried in any support, generally of small size. The electronic label functions according to a contactless mode by means of an input-output interface consisting of the antenna. The antenna is of small size in relation to the dimensions of the electronic label.

The electronic label is read (or written to) by a reader which has a reading antenna for effecting an electromagnetic coupling with the electronic label.

So that the electromagnetic coupling is sufficient despite the small dimensions of the electronic label antenna, one solution consists of the reader being close to the electronic label.

These conditions are not always achievable in practice.

Another solution described in patent application WO 97/49076 consists, as shown schematically in FIG. 1, of using, between the antenna 10 of the reader 1 and the antenna 20 of the electronic label 2, an auxiliary passive antenna 30, sometimes referred to colloquially as a parasitic antenna, which begins to resonate at a given frequency under the action of a radio-frequency signal. When it is thus tuned to the given frequency, this auxiliary passive antenna 30 reinforces the electromagnetic coupling M1 between the reader 1 and the electronic label 2, by focusing the electromagnetic illumination of the antenna 10 of the reader 1 onto the antenna 20 of the electronic label 2. This reinforcement is obtained by electromagnetic coupling M2 between the antenna 10 of the reader and the auxiliary passive antenna 30 and by electromagnetic coupling M3 between the passive antenna 30 and the antenna 20 of the electronic label.

When it is wished to read numerous electronic labels grouped together in the same reading zone of the reader, it is possible to multiply the passive antennae as described above, but the passive antennae, then close to one another, will mutually interfere with each other.

It is also possible to use devices comprising as many active antennae as there are electronic labels. However, this multiplication of the active antennae is expensive since it results in a multiplication of the commands managing the transmission and reception radio frequencies of these active antennae.

SUMMARY OF THE INVENTION

The aim of the present invention is therefore to make it possible to read numerous electronic labels grouped together in the same reading zone of the area, at a reasonable cost.

The object of the invention is an antenna device for reading electronic labels, principally characterised in that the antennae are passive antennae controlled by at least one control means.

The antennae are preferably organised in the form of a matrix comprising L rows and C columns and located according to the said matrix by coordinates (i,j), i varying from 1 to L, j varying from 1 to C, and each antenna (i,j) is controlled by two control means, one controlling the said antennae situated on row i, the other controlling the said antennae situated on column j.

Each control means advantageously consists of a logic-control analogue switch.

According to one embodiment of the invention, the device comprises an indicator light associated with each antenna.

The indicator light can be a diode connected and controlled by the switches controlling the said antenna, or a gas ionisation system supplied and controlled by each passive antenna with which it is associated.

The device comprising, associated with each passive antenna, a second passive antenna, the indicator light can be a diode supplied and controlled by the said second passive antenna.

The invention also relates to a system for reading electronic labels, characterised in that it comprises a reader having at least one antenna and a device as described above.

BRIEF DESCRIPTION OF THE DRAWINGS

Other particularities and advantages of the invention will emerge clearly from a reading of the description given by way of non-limiting example and with regard to the accompanying drawings, in which.

DETAILED DESCRIPTION

Figure 1:
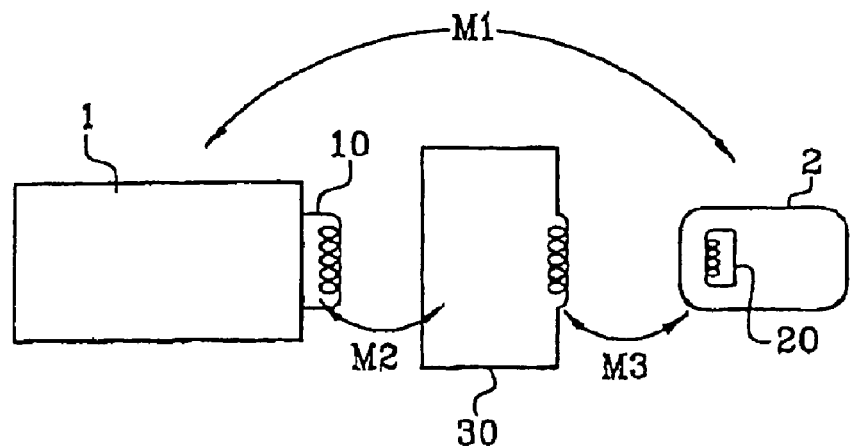
FIG. 1, already described, illustrates schematically a system of electromagnetic coupling between a reader and an electronic label, reinforced by an auxiliary passive antenna.

In the case of FIG. 1, the passive antenna 30 is continuously in a state of functioning although it resonates only according to the radio-frequency signal transmitted by the antenna 10. It is not switched according to an on or off mode.

Figure 2:
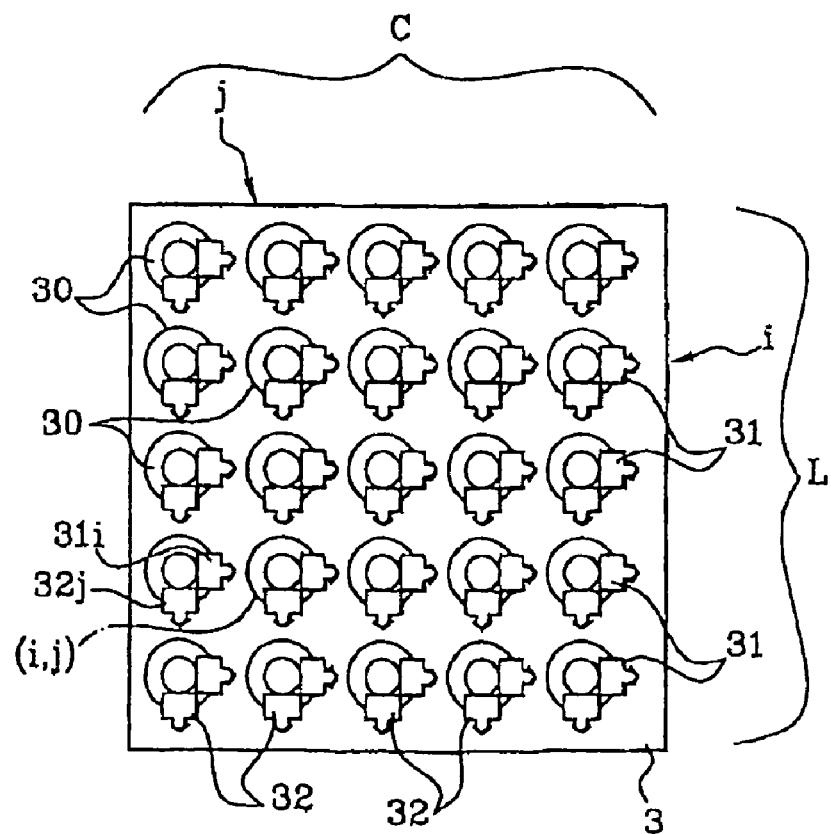
FIG. 2 is a schematic representation of a matrix of passive antennae according to one embodiment of the invention, FIGS. 3a) and 3b) illustrate schematically an example of an electronic label integrated in a sample-analysis tube.

In a preferential embodiment of a system according to the invention depicted in FIG. 2, the passive antennae 30 are organised in a matrix 3 of L rows and C columns, each of these antennae 30 being located by its coordinates (i,j), i varying from 1 to L, j varying from 1 to C.

In FIG. 2, each of the coordinates (i,j) locates an antenna 30, but the matrix 3 may comprise holes, some coordinates (i,j) not locating any antenna 30. In another embodiment, the passive antennae can also be organised according to a volume.

In order to be able to select the passive antenna 30 which it is wished to make able to resonate, each of these passive antennae 30 is controlled by a switch.

The system depicted in FIG. 2 is considered. Each row of passive antennae is controlled by a control means $31_i$, preferentially a logic-control analogue switch; each column of passive antennae is controlled by a control means $32_j$, also preferably a logic-control analogue switch. Hereinafter, as an example of control means, such logic-control analogue switches will be adopted. Finally, each passive antenna (i,j) is controlled by two switches $31_i$ and $32_j$. When the switch $31_i$ and the switch $32_j$ are closed, the passive antenna (i,j) is ready to resonate under the action of the radio-frequency signal transmitted by the antenna 10 of the reader.

Thus L+C logic-control analogue switches suffice to control L×C passive antennae instead of the L×C switches a priori necessary.

The result is a financial saving which is all the more considerable, the greater the number of passive antennae.

An example of an application of the invention to low-temperature storage units for samples for analysis will now be described.

During surgical interventions for example, fragments of tissues from organs are taken and then placed in tubes and preserved at very low temperature with a view to their subsequent analysis.

So as to identify each tube, the normal marking via a bar code printed on a label is advantageously replaced with an electronic label. This is because normal labels subjected to difficult cryogenic temperature conditions sometimes fall off during the various manipulations of the tubes.

Figures 3A, 3B:
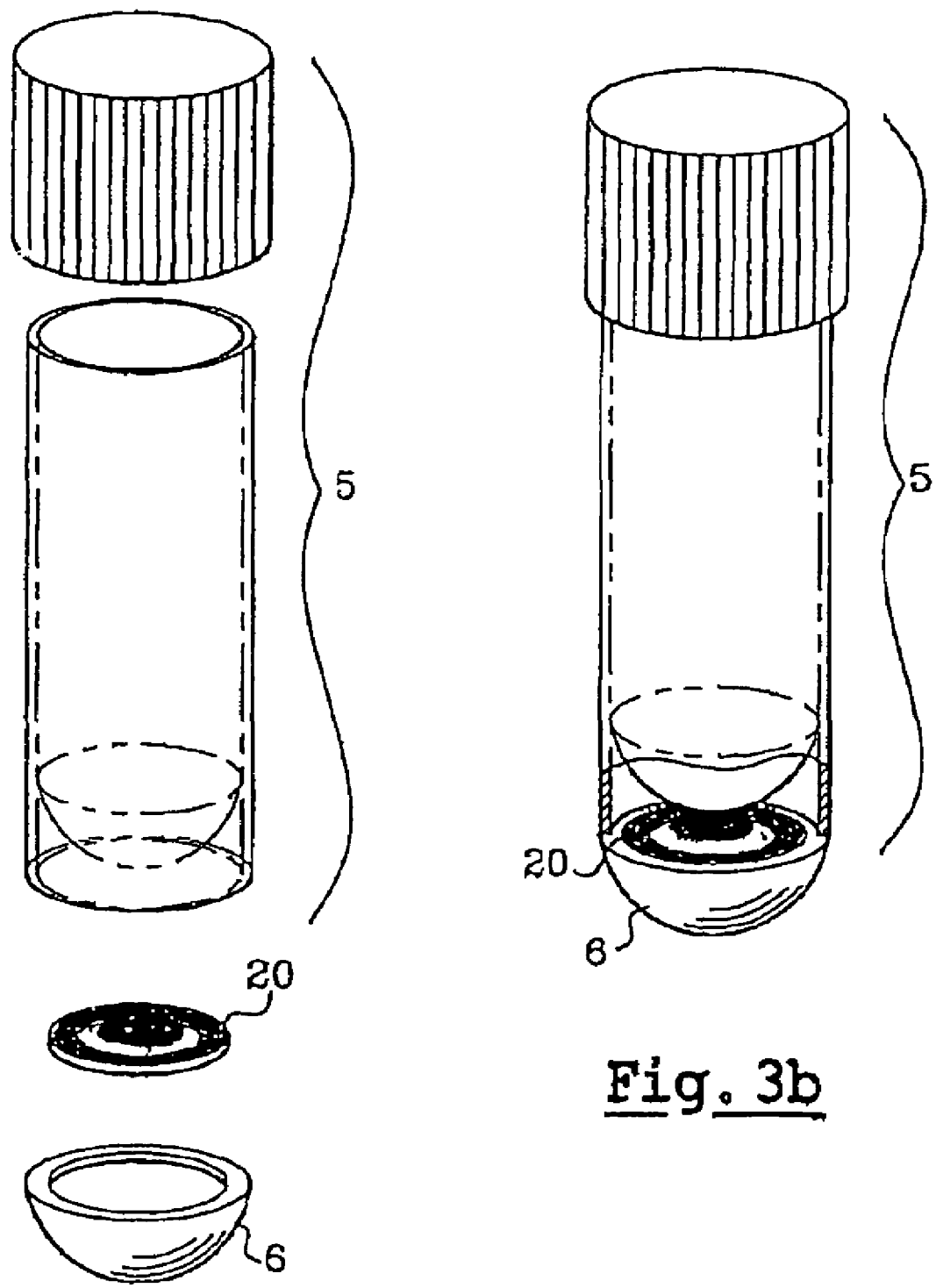

As depicted in FIGS. 3a) and 3b), this electronic label comprising an antenna 20 is integrated in a module 6 fixed to the tube 5, for example by injection, or placed in a dish welded to the base of the tube 5.

Figure 4:
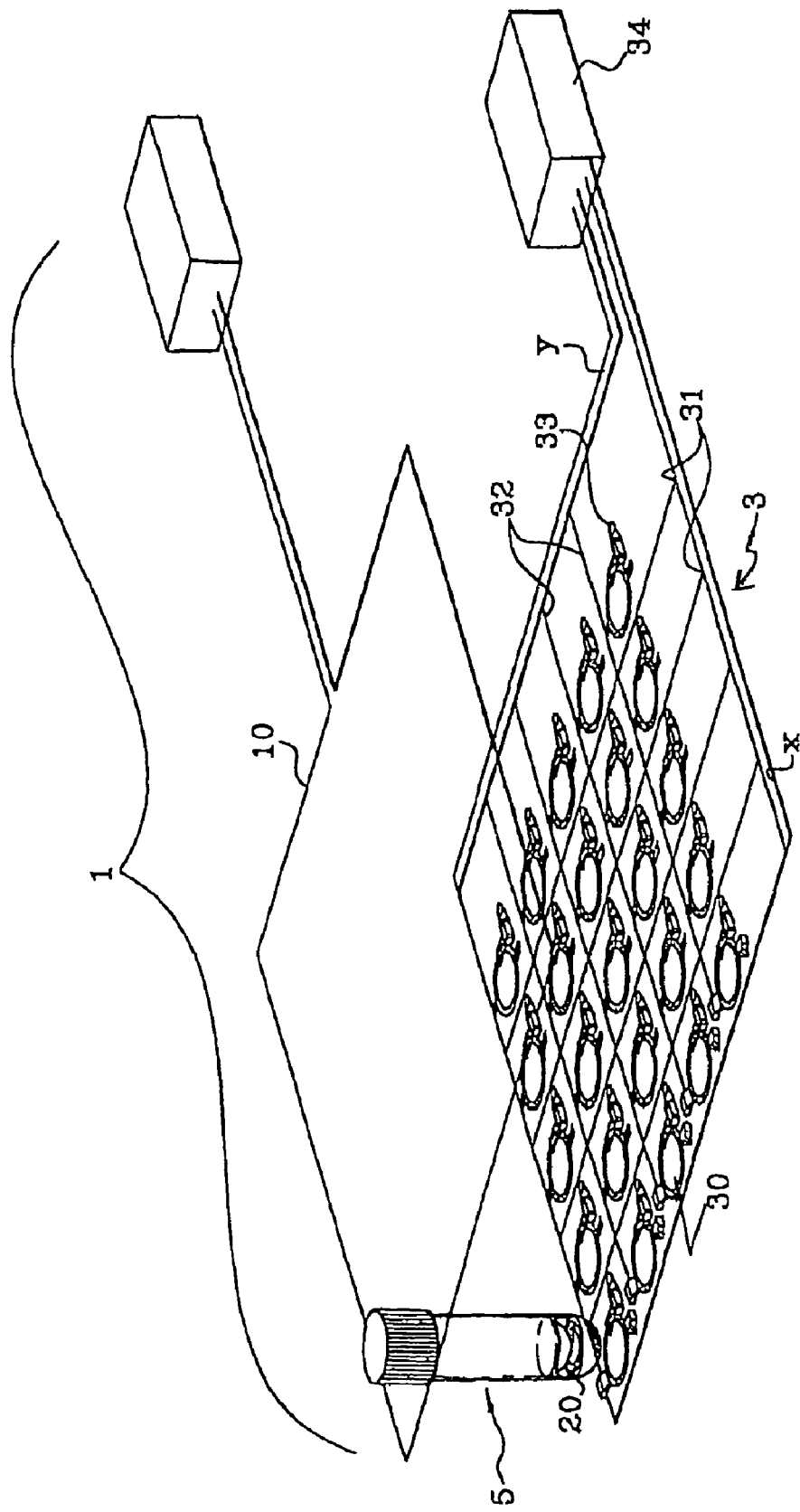
FIG. 4 depicts schematically a system for reading the electronic label of a tube.

FIG. 4 depicts a system for reading an electronic label on the tube 5 by means of its antenna 20: it comprises the antenna 10 of the reader 1 and a matrix 3 of passive antennae 30.

As depicted in FIG. 4, the antenna 10 is sufficiently large to be placed around all the tubes 5. This antenna 10 can be replaced with a smaller antenna which is moved or with several antennae.

The matrix 3 comprises a control device 34 for the L switches 31 situated along an X axis and the C switches 32 situated along a Y axis.

The tube 5 situated facing the passive antenna 30 located by the coordinates (L,C) will for example be considered.

The label on the tube 5 is read by effecting a coupling between the antenna 10 of the reader 1 and the passive antenna 30 located by its coordinates (L,C) and by a coupling between this antenna 30 and the antenna 20. The passive antenna 30 at (L,C) is used by closing the switch $31_L$ situated on the X axis and the switch $32_C$ situated on the Y axis.

Another passive antenna 30 situated at (1,1) for example could just as well have been used for reading the label on the corresponding tube, placed above this antenna 30.

Figure 5:
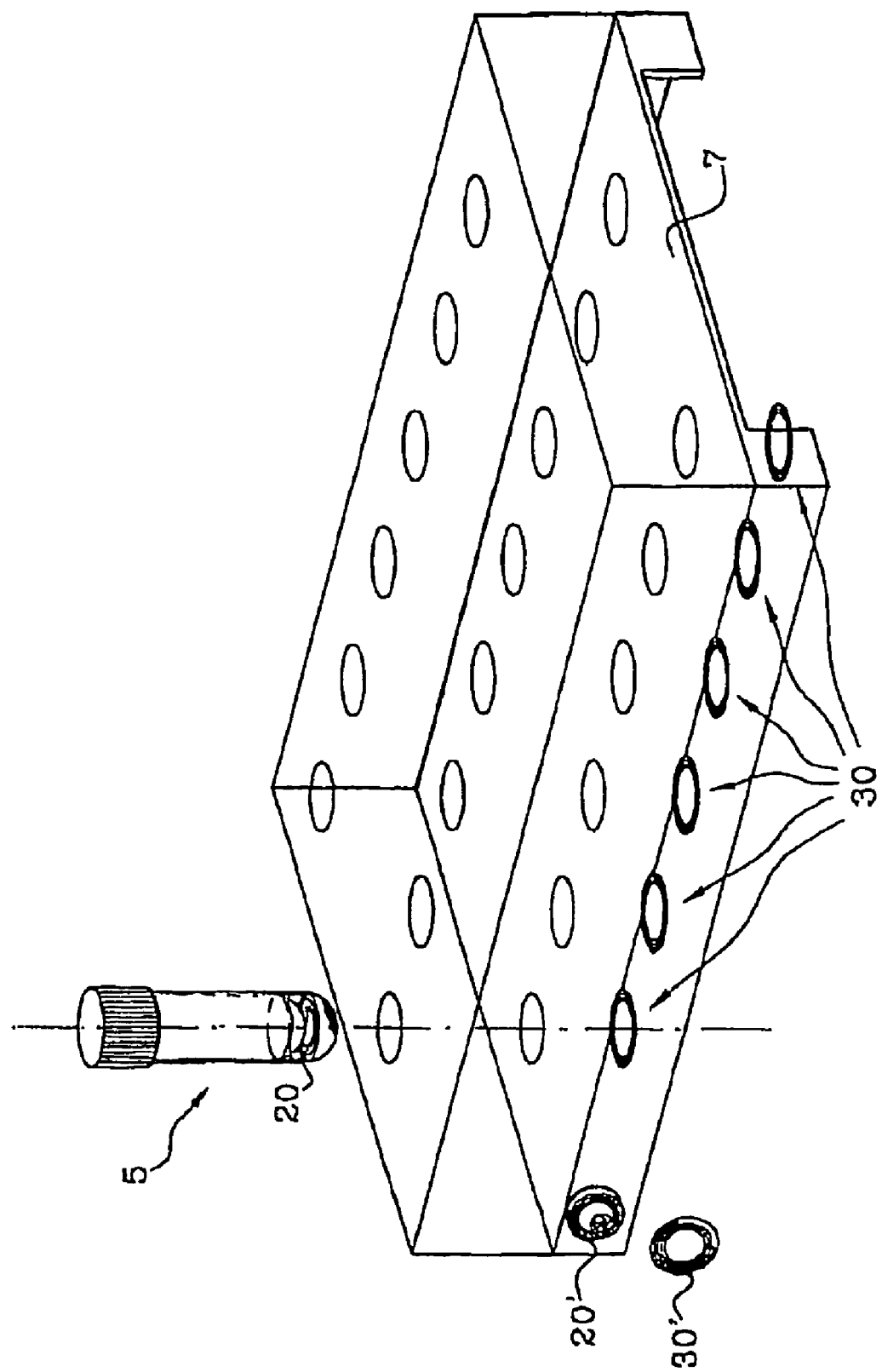
FIG. 5 depicts schematically a tube storage rack.

As depicted in FIG. 5, the tubes 5 are generally placed in racks 7. In order to read, by means of the antenna 20, the electronic labels fixed to the tubes 5, a matrix of passive antennae 30 can be slid under each rack 7. Each rack 7 can also include such a matrix.

Each rack 7 can also be referenced by means of an electronic label comprising an antenna 20', which can be read by means of a passive antenna 30'.

In the example which has just been described, a passive antenna 30 is associated with each electronic label. One passive antenna 30 can however be provided for several electronic labels and therefore several tubes 5 in our example. It is possible to group together, for example, 4 or 9 tubes, which will then be in the same electromagnetic field of the same passive antenna 30.

The reading of each of these 4 or 9 tubes will then have recourse to an anti-collision method. Such methods have been developed to enable a contactless smart card reader to resolve the problem which is presented when several cards are presented simultaneously in the field of the reader.

In a preferential embodiment of the invention, a device for displaying the passive antennae used is added to the passive antenna device 30.

Where the passive antennae are organised in a matrix, a display matrix is added so as to indicate visually the position (i,j) of the passive antenna used and therefore of the electronic label currently being read or written to.

The display matrix consists of indicator lights 33 depicted in FIG. 4. The indicator light corresponding to the passive antenna (i,j) comes on when this antenna is activated.

The indicator light 33 associated with the passive antenna 30, consisting for example of a diode (Light Emitting Diode or LED) can be connected and controlled by the two switches controlling the corresponding passive antenna: the diode comes on when the two switches $31_i$ and $32_j$ are closed.

According to another embodiment, the indicator light 33 associated with the passive antenna 30 is not connected to the passive antenna 30. In a first case, the indicator 33 consists of a gas ionisation system such as neon, supplied and controlled by the radio-frequency signal transmitted by the passive antenna 30. In a second case, a second passive antenna is associated with each of the passive antennae 30 and the indicator light 33, consisting for example of a diode, is supplied and controlled by the radio-frequency signal transmitted by this second passive antenna. The second passive antenna is itself controlled by the passive antenna 30 with which it is associated.

Figure 6:
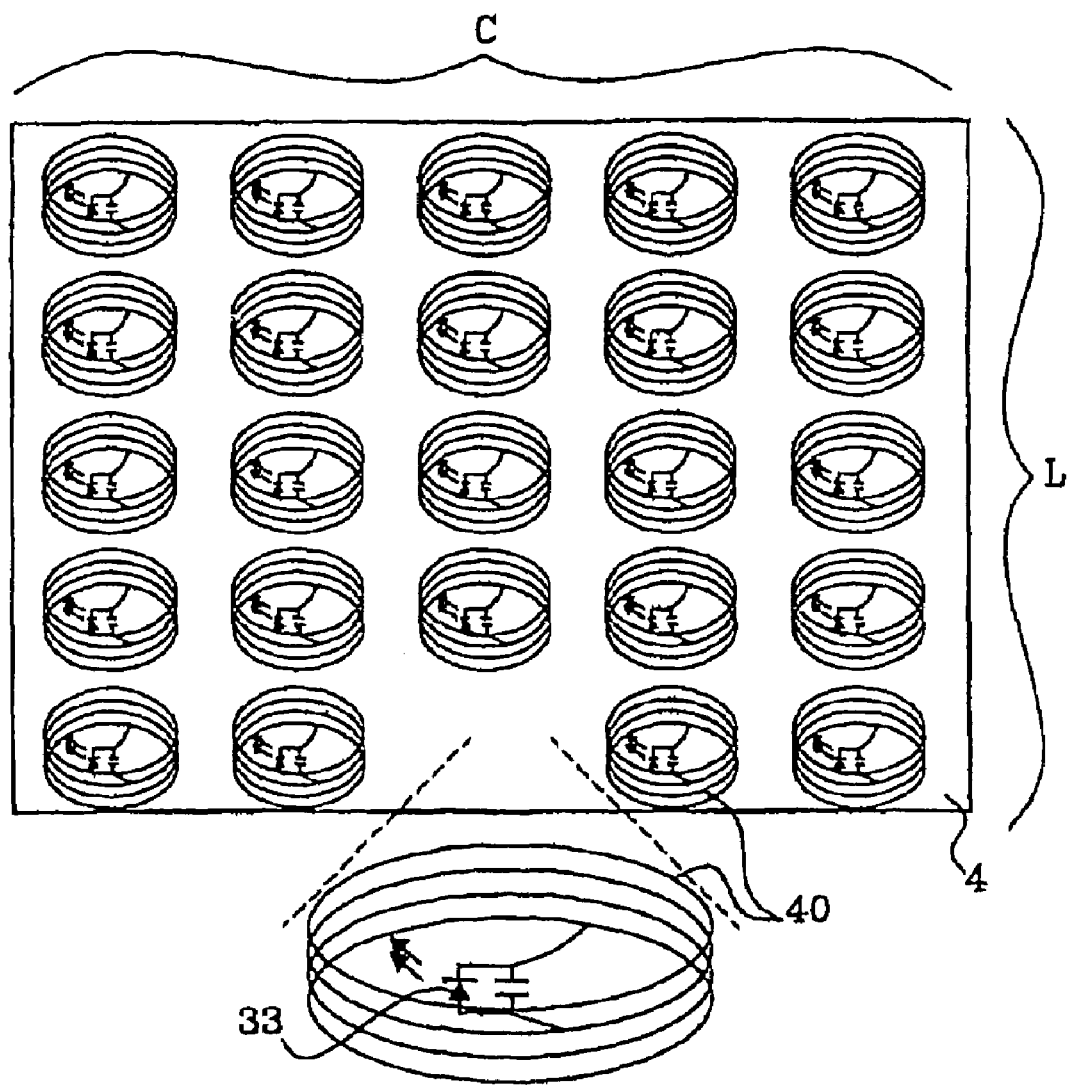
FIG. 6 depicts schematically a case of the supply of an indicator light by a second passive antenna.

In the latter case depicted in FIG. 6, the display matrix 4 then consists of L×C passive antennae 40, each of these passive antennae being associated with a diode 33. An enlargement of a passive antenna 40 is included in this FIG. 6; the transmission of light by the diode is represented by the two arrows.

In the example which has just been presented, the electronic label is situated between the reader and the passive antenna; in another configuration, the passive antenna could just as well have been situated between the reader and the electronic label.

The invention claimed is:

1. An antenna device for reading electronic labels, comprising a plurality of passive antennae organized in the form of a matrix comprising L rows and C columns and identified by coordinates (i, j), i varying from 1 to L, j varying from 1 to C, and wherein each passive antenna (i, j) is selectively enabled and disabled by at least two control means, one associated with row i to selectively enable the antennae situated on row i, and another associated with column j to selectively enable the antennae situated on column j.

2. The antenna device according to claim 1, wherein said two control means select an individual one of said passive antennae for operation.

3. The antenna device of claim 2, wherein said control means disable non-selected antennae from resonating.

4. The antenna device according to claim 1 wherein each control means includes a logic-control analogue switch.

5. The antenna device according claim 1, further including an indicator light associated with each antenna.

6. The antenna device according to claim 5, wherein the indicator light is connected to and controlled by the control means controlling the antenna.

7. The antenna device according to claim 6, wherein the indicator light is a diode.

8. The antenna device according to claim 5, wherein the indicator light is a gas ionization system excited by the antenna with which it is associated.

9. The antenna device according to claim 5, further including, associated with each antenna, a second passive antenna wherein the indicator light is controlled by the second passive antenna.

10. An antenna device for reading electronic labels, comprising a plurality of passive antennae, each of which is controlled by at least one control means, and further including an indicator light associated with each antenna to indicate the state of activation of the antenna with which it is associated.

11. An antenna device according to claim 10, wherein the indicator light is connected to and controlled by the control means controlling the antenna.

12. An antenna device according to claim 11, wherein the indicator light is a diode.

13. An antenna device according to claim 10, wherein the indicator light is a gas ionization system supplied and controlled by the antenna with which it is associated.

14. An antenna device according to claim 10, further including, associated with each antenna, a second passive antenna wherein the indicator light is supplied and controlled by the second passive antenna.

15. A system for reading electronic labels, comprising a reader having at least one antenna and a device having a plurality of passive antennae, wherein the passive antennae are organized in the form of a matrix comprising L rows and C columns and identified by coordinates (i, j), i varying from 1 to L, j varying from 1 to C, and wherein each antenna (i, j) is selected for operation by two control means, one associated with row i to select the antennae situated on row i, the other associated with column j to select the antennae situated on column j.

16. The system of claim 15, wherein said control means disable non-selected antennae from resonating.

17. A system for reading an electronic label, comprising:
a reader having an antenna for communicating with a label;
a passive antenna that resonates at a frequency to reinforce electromagnetic coupling between the antenna of said reader and said label; and
a control element that selectively activates and deactivates the ability of said passive antenna to resonate.

18. The system of claim 17, wherein said control element comprises a switch.

19. The system of claim 18, wherein said switch is in series with said passive antenna.

20. A system for reading electronic labels, comprising:
a reader having an antenna for communicating with a plurality of labels;
a plurality of passive antennae, each of which resonates at a frequency to reinforce electromagnetic coupling between the antenna of said reader and a respective one of said labels; and
a plurality of control elements that selectively activate and deactivate the ability of individual ones of said passive antennae to resonate, to enable said reader to communicate with selected individual labels among said plurality of labels.

21. The system of claim 20, wherein said control elements comprise switches.

22. The system of claim 21, wherein said switches are in series with associated ones of said passive antennae.

23. A system for reading a transponder having a chip and an antenna, comprising:
a reader having an antenna for communicating with a transponder;
a passive antenna that resonates at a frequency to reinforce electromagnetic coupling between the antenna of said reader and said transponder; and
a control element that selectively activates and deactivates the ability of said passive antenna to resonate.

24. The system of claim 23, wherein said control element comprises a switch in series with said passive antenna.

25. The system of claim 23, wherein said transponder comprises a radio-frequency identification device.

26. A system for reading transponders that each contain a chip and an antenna, comprising:
a reader having an antenna for communicating with a plurality of transponders;
a plurality of passive antennae, each of which resonates at a frequency to reinforce electromagnetic coupling between the antenna of said reader and a respective one of said transponders; and
a plurality of control elements that selectively activate and deactivate the ability of individual ones of said passive antennae to resonate, to enable said reader to communicate with selected individual transponders among said plurality of transponders.

27. The system of claim 26, wherein said control elements comprise switches that are in series with associated ones of said passive antennae.

28. The system of claim 26, wherein said transponders comprise radio-frequency identification devices.

* * * * *